Figure 1:
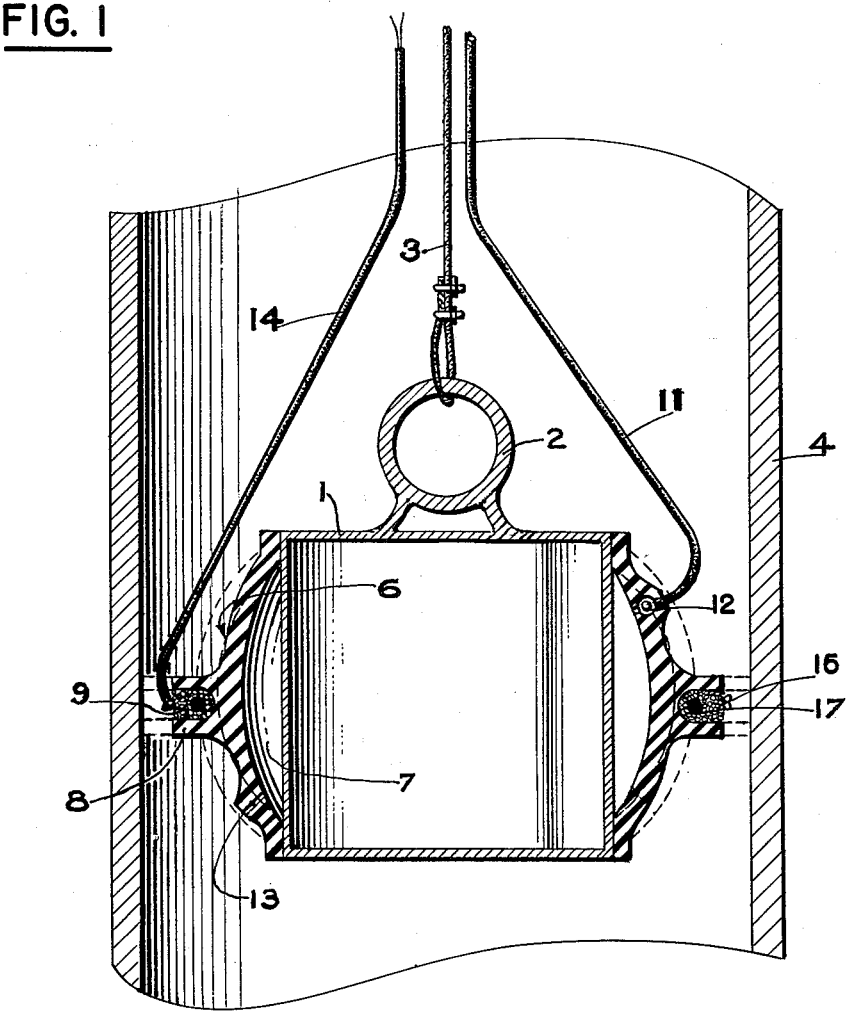

March 6, 1956

A. G. BISSELL 2,737,115

METHOD AND APPARATUS FOR EXPLOSIVELY
FRACTURING TUBULAR MEMBERS

Filed Sept. 25, 1952

2 Sheets-Sheet 1

Inventor
ADDISON G. BISSELL

By
Attorneys

March 6, 1956 A. G. BISSELL 2,737,115
METHOD AND APPARATUS FOR EXPLOSIVELY
FRACTURING TUBULAR MEMBERS
Filed Sept. 25, 1952 2 Sheets-Sheet 2

Inventor

ADDISON G. BISSELL

United States Patent Office 2,737,115
Patented Mar. 6, 1956

2,737,115

METHOD AND APPARATUS FOR EXPLOSIVELY FRACTURING TUBULAR MEMBERS

Addison G. Bissell, Washington, D. C.

Application September 25, 1952, Serial No. 311,556

2 Claims. (Cl. 102—20)

(Granted under Title 35, U. S. Code (1952), sec. 266)

This invention relates to cutting apparatus and, more particularly, to a method of and apparatus for explosively fracturing tubular walls.

This invention may be manufactured and used by or for the Government of the United States of America for governmental purposes without the payment of any royalties thereon or therefor.

In many piping installations, such as in well-piping or water-submerged tubing, it frequently becomes desirable to cut or fracture the tubing at portions along its length which are inaccessible to conventional mechanical cutters. Various other expedients have been considered but, for rather apparent reasons, these have not been found suitable. Torch cutters, for instance, are impractical because of the need for supplying oxygen at the remote, inaccessible work areas, which, sometimes are under water. Electric arc burners are equally impractical due to the difficulties involved in positioning and controlling them. Attempts further have been made to cause a parting of the pipe by first heating the section to be severed and then exerting a pulling force to literally tear the heated metal, but, as can be appreciated, such an expedient would have very limited feasibility.

There is some art on explosive cutting but so far as I am aware, it is concerned solely with the perforating or punching of holes at remote locations and the equipment is not in the least suitable for any cutting or fracturing operations. Thus, for instance, it has been noted that attempts were made to perforate piping by explosively firing slugs through the pipe walls and it is obvious that no continuous cut could be made by such a means. As a consequence, it now appears that no practical solution to the difficulty has been worked out and, up to the present, the problem exists to the same extent as before.

Accordingly, a principal object of this invention is to provide a practical and rapid method and apparatus for making a continuous cut in a tubular wall disposed at a remote location.

Another object is to provide a means for moving an explosive charge into such a position with relation to a remote wall area to be cut that the fracturing force of the detonated charge is directed mainly against the wall.

Other objects of this invention are to provide apparatus for fracturing a pipe circumferentially from a position inside or outside the pipe; to provide apparatus for fracturing a pipe which will not deform the pipe, and to provide cutting apparatus that is rapid, simple to operate, and economical to construct.

Other objects will be readily understood from the detailed description.

The objects of the invention are accomplished by utilizing an expansible body as a means for supporting the explosive charge. The expansible body, preferably, is supported on a rigid block that may be suspended and dropped axially of the tubing into a position adjacent to the area to be fractured; the block and expansible body assembly being so sized as to move freely along the tubing when the body is in its unexpanded state. Upon reaching this desired position, the body is inflated pneumatically or hydraulically to carry the explosive charge supported by it into such close proximity with the wall that the force of the ensuing blast strikes directly on the wall portion to be fractured.

The apparatus is particularly useful in severing or parting lengths of piping and, for such purposes, an endless charge formed of wicking or cotton yarn saturated with blasting gelatin, or, preferably, of a specially shaped cast demolition body, is disposed loosely about the circumference of the expansible body member, so that subsequent expansion will place the charge in continuous contact with the peripheral surface of the pipe to be parted. Blasting under such continuous contact conditions not only concentrates the force on the contacted area, but the diametrically opposed forces set-up by the circumferential blast prevent a dissipation of forces away from the work area. However, as will be realized, the present invention is not limited to such a particular use and the basic principles involved in its practice may find advantageous application in many other operations.

Figure 2:
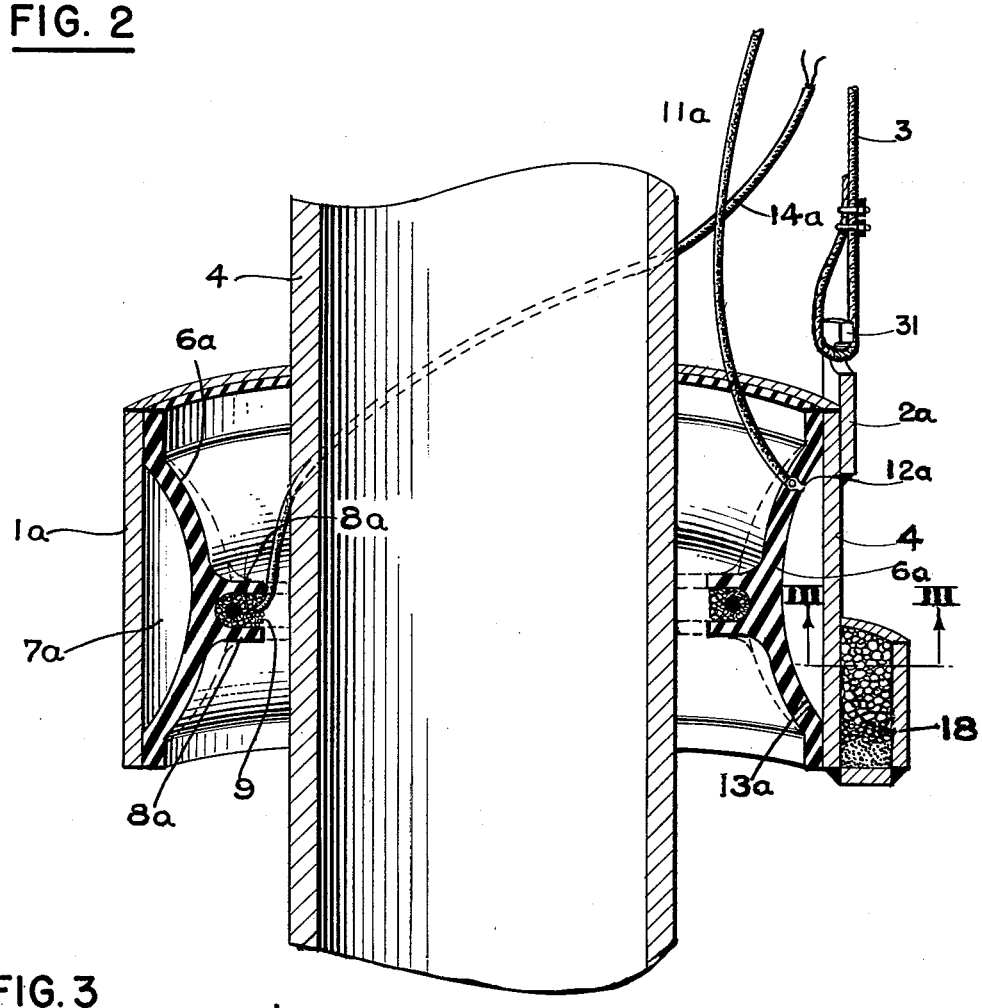
Figure 3:
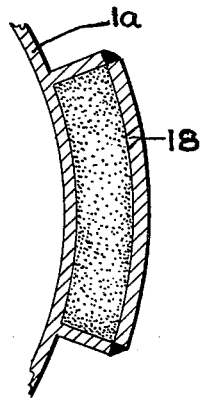

The invention is illustrated and described in the accompanying drawings of which Fig. 1 is a sectional view of the explosive, wall-fracturing mechanism held in a suspended position adjacent to the wall portion of the tube to be cut, the operative blasting position of the mechanism being indicated by the dotted lines; Fig. 2 a vertical section of a modified form adapted to encircle the pipe and exert its cutting force radially inwardly; Fig. 3 a section taken along lines III—III of Fig. 2, and Fig. 4 a section of a modified explosive charge.

Referring to the drawings, and more particularly to the form of the invention illustrated in Fig. 1, the wall-fracturing mechanism there shown is formed of a rigid box-like frame 1 provided with a bail 2 secured to a cable 3 by means of which the frame may be dropped or otherwise moved through a well-pipe or other lengths of tubing 4. The box frame, of course, is sufficiently small so as to be freely movable through the tubing even when the other elements of the mechanism which will be described are secured to it, and in addition, it may be found desirable to weight box-frame 1 and render it more compact and solid by filling it with sand, gravel, or if desired, by providing an integrally solid box.

One of the features of the present invention resides in the fact that, although the mechanism is freely movable through the pipe, when it has been moved into operative position, it may be enlarged so as to position its explosive charge in close proximity, or in actual contact, with the particular circumferential section of the pipe wall to be cut. In the Fig. 1 form, such mechanism is provided by securing a resilient expansible rubber or plastic diaphragm 6 secured at its upper and lower edges to frame 1 and also having a slightly arcuate interior curvature so as to form, between this curvature and the sidewalls of the box, a fluid-pressure chamber 7. Also, the exterior surface of expansible diaphragm 6 is provided centrally with a pair of radially extending lips or flanges 8 adapted to form between themselves a recess in which an explosive charge 9 is carried.

One of the principal purposes of diaphragm 6 is to provide a means that can be deflated to carry the explosive through the piping and then inflated to bring its supported charge into contact, or at least close proximity, with the walls of the piping. Daphragm 6 can be expanded either by pneumatic or hydraulic means and to so expand it a pressure line 11, which in the present case is an air-pressure line, is connected into fluid-pressure chamber 7; line 11 being of sufficient length to extend outwardly through the tube to a convenient, exterior position at which the fluid pressure may be controlled to expand the diaphragm when desired.

After the mechanism has been moved into the desired position the pressure mechanism is operated and diaphragm 6 expanded to bring the explosive charge into contact with the pipe. Preferably, fluid pressure line 11 is provided with a ball check valve 12 adapted to prevent the escape of air from chamber 7 once this air has been introduced. However, in actual operation it may become apparent to the operator that the mechanism is not correctly positioned and he may desire to alter the position before detonating the charge. To permit this change, diaphragm 6 also is provided with a pin-hole bleeder valve, or opening 13, so that, when it becomes desirable to alter the position, this may be accomplished simply by shutting off the air supply and permitting air chamber 7 to exhaust through this bleeder opening. As a result of this arrangement, it is desirable to maintain the air supply so as to prevent deflation of the diaphragm due to leakage. Of course, other pneumatic systems may be used to accomplish the purposes of this invention, although the present system is considered desirable because of its extreme simplicity.

With the explosive charge positioned in contact with the wall, which position is illustrated in the dotted lines of Fig. 1, the charge may be detonated electrically from a remote position adjacent the air supply controls by means of current supplied through a detonating conduit 14. The actual charge can be of any conventional form, the particular charge illustrated in Figs. 1 and 2 being formed of a body member of candle wicking or cotton yarn 16 which is thoroughly saturated with a blasting gelatin and, in practice, it has been found suitable to use about one pound of gelatin for each five square inches of wall section to be fractured. Embedded in wicking 16 is a suitable detonating cord 17 provided in the customary manner with a detonating cap electrically connected to the control source by conduit 14.

With this arrangement, it may be seen that a simple, inexpensive and reliable blasting mechanism is provided which is adapted to be easily brought into blasting position, then expanded to bring the explosive charge into contact with the wall to be fractured and then detonated; all of these operations being controllable from a remote source so that otherwise inaccessible wall areas are easily reached. The blasting force of the explosive is fully effective to cut through or fracture pipe walls of most any thickness normally encountered, and, as will be appreciated, one reason for this effectiveness is because the blasting charge is so positioned in actual contact with, or in such close proximity to, the wall of the pipe, that the forces released impinge directly on and are concentrated upon a relatively narrow pipe wall section.

A further advantageous feature of the illustrated arrangement is that the explosive charge is an endless loop wrapped circumferentially about diaphragm 6 and brought into a continuous contact with the narrow section of wall where the fracture is to be made. As a result of this continuous contact, the forces which might otherwise dissipate and become ineffective instead react in diametrical opposition one to the other so that such dissipation is not possible. In effect, the diametrical opposition caused by the circumferential blast produces a solid circular core which rebuffs dissipation and directs the major portion of the forces outwardly upon the wall to be cut. For this reason, it may be possible, if desired, to eliminate rigid box frame 1 and make the whole mechanism in the form of an expansible heavy wall balloon. The interior of this balloon would become a circular core under such circumferential blasting conditions.

The modified form of the invention illustrated in Figs. 2 and 3 functions in much the same manner as the form described above, this modified form differing primarily in that it is adapted to be moved axially along the exterior wall of piping. It is formed of the same parts as the form illustrated in Fig. 1, although these parts are of a modified shape so as to accomplish the desired purposes. In place of box-frame 1, the Fig. 2 modification includes a rigid ring or collar 1a to the interior surface of which is secured diaphragm 6a provided with radially inwardly projected lips or flanges 8a formed to carry explosive charge 9. Diaphragm 6a is arcuate in shape so as to form a fluid pressure chamber 7a which is supplied through an air or hydraulic conduit 11a and is exhausted through a bleeder valve 13a. The explosive mechanism may be precisely the same as that described previously.

Collar 1a is suspended, or otherwise engaged for movement along the exterior of pipe 4, by cable 3, which, as shown, is secured to bail 2a welded to one side of the collar. With such an arrangement, it becomes desirable to counter-balance the pulling force exerted on cable 3 so as to prevent the apparatus from canting and becoming jammed, and a counter-balance, as presently contemplated, is provided by a weight 18 disposed substantially in line with the supporting point of the apparatus. The weight, as may be seen, may be provided by rocks, sand or the like carried in a chamber that is welded to the casing.

The manner in which the Fig. 2 modified blasting apparatus functions is the same as that described with reference to the Fig. 1 form in that the mechanism first is moveable in a deflated position to bring the explosive charge into adjacency with section of the wall to be cut and then inflated by any desired fluid pressure mechanism to carry explosive charge 9 into contact with this wall section. The blast is effective in producing the cut because of its contact with the section to be cut and the fact that such a close contact permits concentration of the forces of the blast on this section. The diametrically opposed forces previously discussed are not as effective in this modification, rigid collar 1a being relied upon to oppose and prevent dissipation of the forces along ineffective lines. The strength of this collar need not be excessive to effectively prevent loss of blasting force because any such outwardly proceeding forces are cushioned by means of the pressure chamber 7a in fluid pressure.

Figure 4:
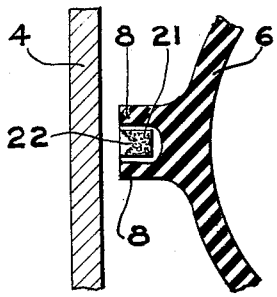

Fig. 4 illustrates a modified form of the demolition charge which has been found most effective due to the fact that it is specially shaped in a manner most efficient for producing the cut. This explosive charge is formed of a cast, multiple segment body member 21 mounted loosely in the recess of diaphragm 6 and provided on its exposed side with a V-shaped groove 22 which, in practice, has been found to produce the desired cut in the most efficient manner. Explosive body 21 may be cast of most any suitable material and, if desired, a plastic explosive, such as pentalite, may be used. Operation of a mechanism utilizing this form of explosive charge is the same as that described above.

Obviously many modifications and variations of the present invention are possible in the light of the above teachings. It is, therefore, to be understood that within the scope of the appended claims the invention may be practiced otherwise than as specifically described.

I claim:

1. Apparatus for explosively fracturing a tubular wall, the apparatus comprising a rigid body, a resilient diaphragm secured to an exterior surface of said body and adapted when expanded to form a fluid chamber with the body, fluid pressure means for expanding said diaphragm, said body being sized to pass freely axially of said tube with the diaphragm deflated, said diaphragm being provided exteriorally with a circumferential recess, and an exposive charge-carrying member loosely mounted throughout the length of said circumferential recess, said arrangement permitting said body to be moved axially of the tube to position said charge adjacent the wall portion to be fractured and said diaphragm to be expanded to position said charge in close proximity with said wall portion, whereupon diametrically opposed forces released upon detonation of the charge are directed exteriorally of said body and against said tubular wall.

2. Apparatus for explosively fracturing a tubular wall, the apparatus comprising a rigid body, a resilient diaphragm secured to an exterior surface of said body and adapted when expanded to form a fluid chamber with the body, fluid pressure means for expanding said diaphragm, said body being sized to pass freely axially of said tube with the diaphragm deflated, said diaphragm being provided exteriorly with a circumferential recess, and a cast multiple-segment explosive charge-carrying member continuously mounted throughout the length of said circumferential recess, said arrangement permitting said body to be moved axially of the tube to position said charge adjacent the wall portion to be fractured and said diaphragm to be expanded to position said charge in close proximity with said wall portion, whereupon diametrically opposed forces released upon detonation of the charge are directed exteriorally of said body and against said tubular wall.

References Cited in the file of this patent
UNITED STATES PATENTS

| | | |
|---|---|---|
| 1,641,483 | Green | Sept. 6, 1927 |
| 2,210,125 | Raymond et al. | Aug. 6, 1940 |
| 2,436,036 | Defenbaugh | Feb. 17, 1948 |
| 2,441,894 | Mennecier | May 18, 1948 |
| 2,543,057 | Porter | Feb. 27, 1951 |
| 2,587,244 | Sweetman | Feb. 26, 1952 |
| 2,690,123 | Kanady | Sept. 28, 1954 |